(12) United States Patent
Caldeira et al.

(10) Patent No.: US 12,009,523 B2
(45) Date of Patent: Jun. 11, 2024

(54) ELECTRODE WITH CURRENT COLLECTION MULTIPLE ARRAY

(71) Applicants: CENTRE NATIONAL DE LA RECHERCHE SCIENTIFIQUE, Paris (FR); INSTITUT POLYTECHNIQUE DE GRENOBLE, Grenoble (FR)

(72) Inventors: Vincent Caldeira, Grenoble (FR); Laetitia Dubau, Grenoble (FR); Marian Chatenet, Meylan (FR)

(73) Assignees: CENTRE NATIONAL DE LA RECHERCHE SCIENTIFIQUE, Paris (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 256 days.

(21) Appl. No.: 16/643,351

(22) PCT Filed: Aug. 29, 2018

(86) PCT No.: PCT/EP2018/073269
§ 371 (c)(1),
(2) Date: Feb. 28, 2020

(87) PCT Pub. No.: WO2019/043076
PCT Pub. Date: Mar. 7, 2019

(65) Prior Publication Data
US 2020/0350592 A1    Nov. 5, 2020

(30) Foreign Application Priority Data

Aug. 30, 2017   (FR) ...................................... 1758012

(51) Int. Cl.
*H01M 4/74* (2006.01)
*H01M 4/24* (2006.01)
(Continued)

(52) U.S. Cl.
CPC ............ *H01M 4/742* (2013.01); *H01M 4/244* (2013.01); *H01M 4/806* (2013.01); *H01M 4/808* (2013.01);
(Continued)

(58) Field of Classification Search
CPC .. H01M 10/0525; H01M 10/30; H01M 4/742; H01M 4/244; H01M 4/806; H01M 4/808; H01M 8/0202
(Continued)

(56) References Cited

U.S. PATENT DOCUMENTS 4,372,823 A * 2/1983 Church ................ H01M 4/244
205/333
5,993,999 A    11/1999 Rivers et al.
(Continued)

FOREIGN PATENT DOCUMENTS

EP    0028879 A2    5/1981
EP    1156544 A2    11/2001
(Continued)

OTHER PUBLICATIONS

Church (numbered) (Year: 1983).*
(Continued)

*Primary Examiner* — Matthew T Martin
*Assistant Examiner* — Paul Christian St Wyrough
(74) *Attorney, Agent, or Firm* — NIXON & VANDERHYE

(57) ABSTRACT

Disclosed is an electrode for an energy storage rechargeable device, including a plurality of electrode material layers and a plurality of porous current collector layers, the electrode material layers and current collector layers being arranged in a specific manner, an energy storage rechargeable device including the electrode, and the uses of the electrode.

19 Claims, 10 Drawing Sheets

Figure 1:
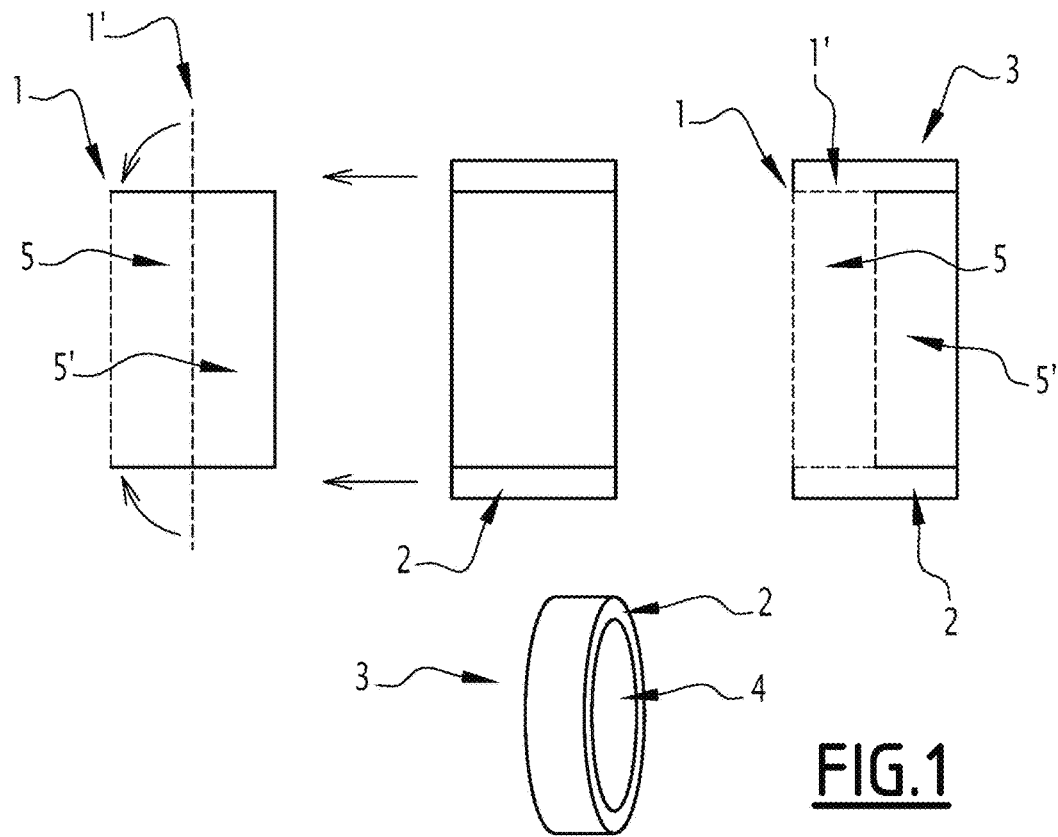

(51) Int. Cl.
*H01M 4/80* (2006.01)
*H01M 10/0525* (2010.01)
*H01M 10/30* (2006.01)

(52) U.S. Cl.
CPC ....... *H01M 10/0525* (2013.01); *H01M 10/30* (2013.01)

(58) Field of Classification Search
USPC .......................................................... 429/229
See application file for complete search history.

(56) References Cited

U.S. PATENT DOCUMENTS

| | | | | |
|---|---|---|---|---|
| 8,043,748 | B2 * | 10/2011 | Geng | ..................... C01G 51/04 429/231 |
| 2001/0049032 | A1 | 12/2001 | Gan | |
| 2002/0062138 | A1 | 5/2002 | Gan et al. | |
| 2013/0260264 | A1 * | 10/2013 | Shimizu et al. | ........ H01M 4/90 429/405 |
| 2013/0260265 | A1 | 10/2013 | Shimizu et al. | |

FOREIGN PATENT DOCUMENTS

| | | | |
|---|---|---|---|
| JP | 2002-015725 | A | 1/2002 |
| JP | 2002-198061 | A | 7/2002 |
| JP | 2002-237300 | A | 8/2002 |
| JP | 2013-214383 | A | 10/2013 |
| JP | 2015-141862 | A | 8/2015 |
| KR | 10-2015-0128279 | A | 11/2015 |
| WO | 01/097304 | A1 | 12/2001 |

OTHER PUBLICATIONS

International Search Report, mailed Nov. 12, 2018, from corresponding International Application No. PCT/EP2018/073269.
Office Action issued in Japanese Patent Application No. 2020-512604 dated Mar. 8, 2022.
Office Action issued in Korean Patent Application No. 10-2020-7006082 dated Apr. 25, 2023.

* cited by examiner

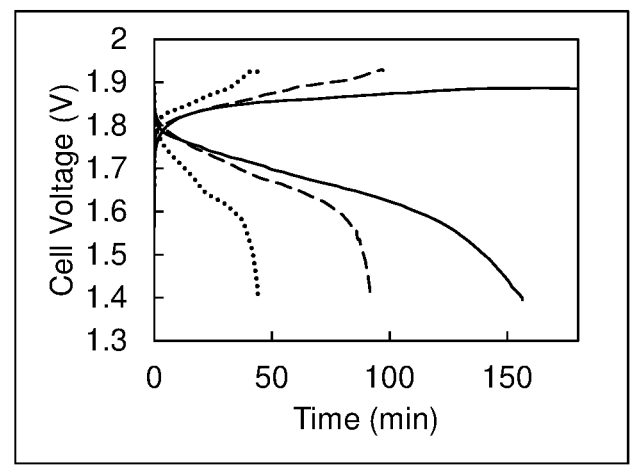
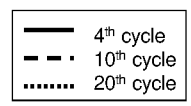
FIG. 4a
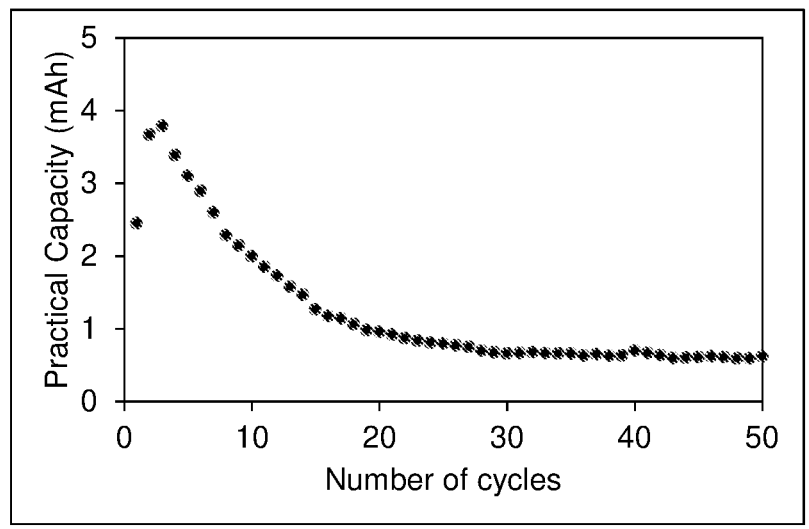
FIG. 4b

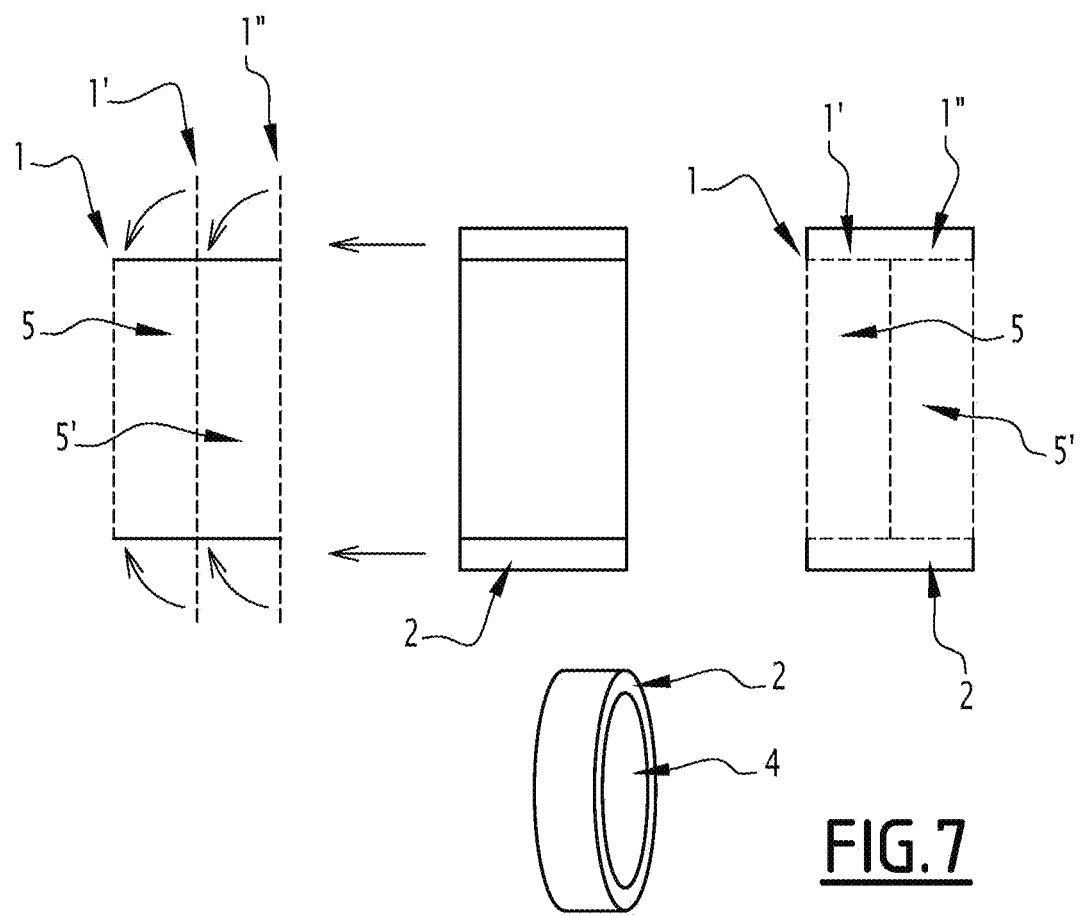

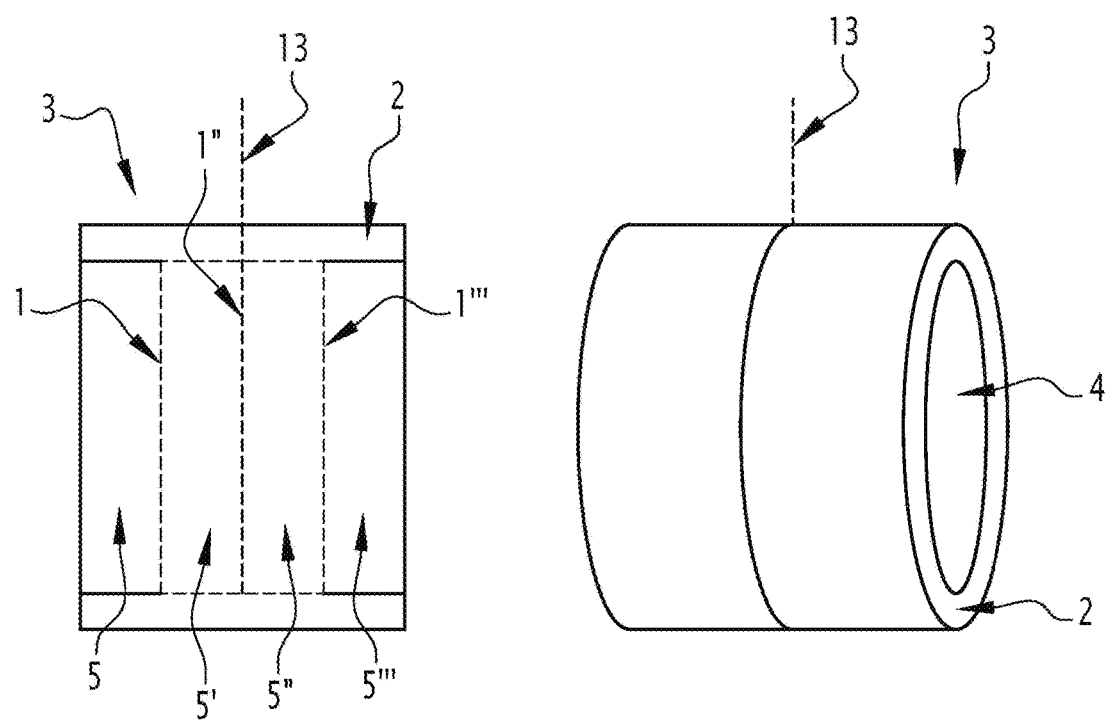
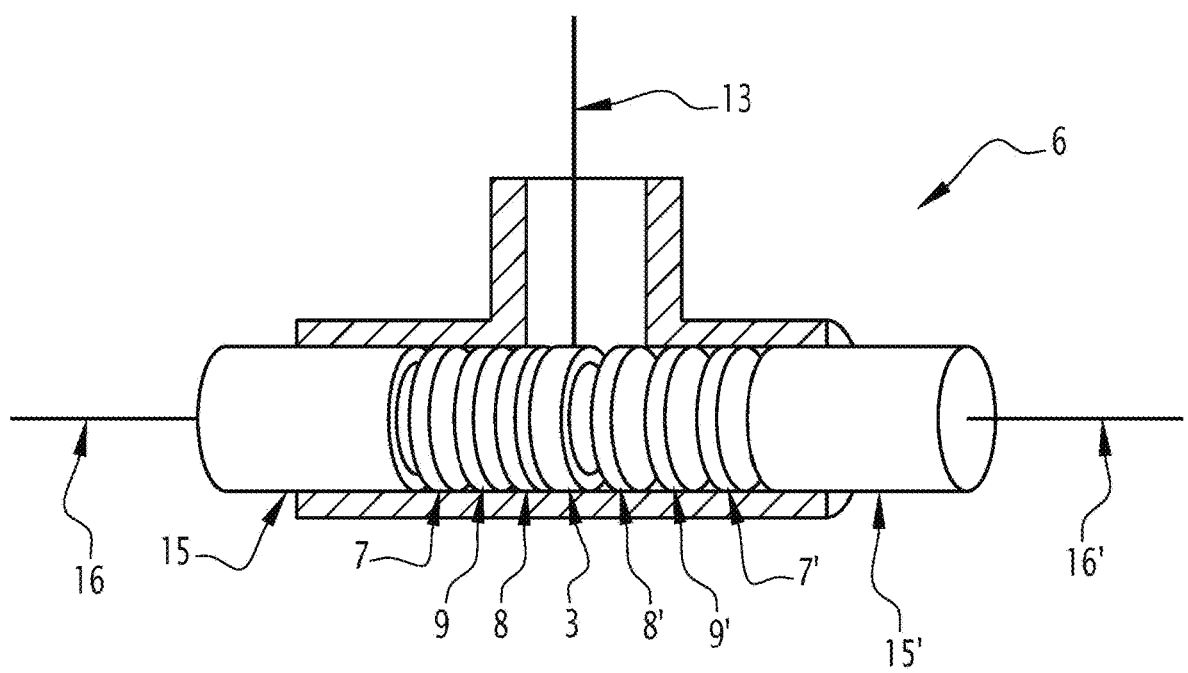

ELECTRODE WITH CURRENT COLLECTION MULTIPLE ARRAY

BACKGROUND OF THE INVENTION

Field of the Invention

The invention relates to an electrode for a rechargeable energy storage device, comprising several electrode material layers and several porous current collector layers, said electrode material and current collector layers being arranged in a specific manner, a rechargeable energy storage device comprising said electrode, as well as the uses of said electrode.

The invention typically but not exclusively applies to the rechargeable electrochemical energy storage devices in which an increase of the energy density is desired, without however reducing the power.

Description of the Related Art

The electrochemical accumulators have become indispensable components in stationary and portable applications, such as portable electronic devices, electrical or mechanical apparatuses. They are also widely studied for a use in electric vehicles as well as in the field of energy storage. The technologies and variants are numerous (Lead-Acid, Nickel-Cadmium, Nickel-Metal-Hydrides, Lithium, Sodium-Sulfur, Zinc-Air, Zinc-Nickel, etc . . . ).

Until the end of the 80's, the two main technologies widespread in the market was the lead accumulators (in vehicle starting systems, emergency power for telephone exchange, industrial or consumer applications in which the mass and the volume are not essential criteria . . . ) and the nickel-cadmium accumulators (in portable tool, toys, emergency lighting . . . ). The drawbacks observed in the lead technology (weight, fragility, use of a corrosive liquid) and in the nickel-cadmium technology (cadmium toxicity) have led to the development of other alkaline accumulators of higher capacity (higher quantity of electricity released at the discharge), more environment-friendly, more economical and comprising plentiful raw materials such as those comprising a zinc negative electrode (for example, zinc-air batteries, zinc-nickel batteries).

However, such systems may also compete with the Li-ion systems, mainly because of their short cycling lifetime or short cyclability (i.e. that the number of times when the accumulator can release the same energy level at each new recharge is small). In particular, these systems suffer from a non-negligible loss of capacity mainly caused by the change of morphology of the zinc electrode, or even from short-circuits caused by the formation of dendritic or powdery deposits. In particular, the deposits of the dendritic type rapidly lead to zinc growths perforating the separators and to the short-circuiting due to the contact between the two electrodes of opposed polarity. As regards the deposits of the powdery type, they are most often not likely to allow the reconstitution of electrodes adapted to a satisfying operation, because the adhesion of the active material to the support is insufficient. Moreover, the reduction of the oxides, hydroxides and zincates into zinc at the anode during the recharges is characterized by morphological changes of said electrode. Indeed, according to the modes of operation of the accumulators, different types of morphological modifications of the anode, due to a phenomenon of non-uniform zinc redistribution during the formation thereof, are observed. Several solutions have been proposed in order to remedy the dendritic growth and/or the non-uniform zinc redistribution, such as adding additives, whether these latter are incorporated to the electrolyte or to the anode active material, intended in particular to limit the solubility of the zincates; the use of mechanical methods aiming at reducing the formation of dendrites and at avoiding the powdery deposits (circulation of the electrolyte and/or of the zinc electrode in a dispersed form); the control of the charge parameters (intensity, voltage, . . . ) and the use of pulsed currents; or the use of separators resisting to the formation of dendrites, in particular of microporous types, or of exchange membranes.

In particular, the patent application EP0028879 discloses a nickel-zinc battery in which the zinc electrode comprises a current collector in the form of a conductive grid and an electrode material deposited on the current collector comprising a zinc-based active material, natural cellulose fibres or additives capable of limiting the solubility of the zincates.

These various techniques have however proven to be insufficient to improve the energy density.

In parallel, the patent application U.S. Pat. No. 5,993,999 discloses a battery comprising an electrode including successively a current collector layer, an anode material layer, potentially a layer chosen among an absorbent layer (porous polypropylene) and a current collector layer, an anode material layer and a current collector layer. However, the structure of this electrode may lead to the formation of dendrites, or other zinc deposits, on the external current collector surfaces in direct contact with the electrolyte, deposits known for having a negative effect on the electrochemical performances.

SUMMARY OF THE INVENTION

Hence, the purpose of the present invention is to compensate for the drawbacks of the prior art, and in particular to provide an electrode for a rechargeable energy storage device making it possible to increase the energy density and/or to obtain a good cycling lifetime without however reducing the power of said device.

The invention has hence for object an electrode for a rechargeable energy storage device characterized in that it comprises two external layers and several internal layers interposed between the two external layers, said internal and external layers comprising several electrode material layers ME and several porous current collector layers CC, said electrode material ME and current collector CC layers being alternated according to the repetition pattern —[CC—ME]— (or —[ME—CC]—) and at least one of the two external layers of the electrode is an electrode material layer ME.

When one of the external layers is a porous current collector layer CC, the latter, due to the configuration/assembly of the battery, is not in direct contact with the electrolyte.

Hence, thanks to the use of several porous current collector layers distributed in the electrode, with at least one of the two external layers of the electrode being an electrode material layer ME, a current collection multiple array is created and allows improving the energy density of said electrode while avoiding the short-circuits by formation of dendrites during the recharge. In particular, the internal current fields are improved, hence allowing a better current distribution within the electrode and a more homogeneous zinc redistribution. Besides, the reversibility of the electrode is improved.

Moreover, the inventors of the present application have surprisingly discovered that the electrode structure as defined hereinabove is particularly adapted when the conductivity of the active material in the electrode material is low (i.e. <$10^{-1}$ S cm$^{-1}$) and/or the thickness of the electrode within the device is not a limitative factor (for example, stationary applications). It is also adapted for the devices in which the transport of material and charges in the electrolyte is not limitative (par example, supercapacitors).

In particular, the electrode is intended to be arranged in a rechargeable energy storage device comprising the electrode, a counter-electrode and an electrolyte, the external electrode material layer ME being intended to face an external layer of the counter-layer and intended to be in direct contact with the electrolyte.

According to an embodiment of the invention, the electrode may have a thickness varying from about 50 μm to 4 mm, and preferably from about 500 μm to 2 mm.

At least a part or each of the porous current collector layers CC may be in the form of a grid, a perforated sheet, a felt, a meshing, a fabric, a foam, preferably an open-pore foam.

Each of the porous current collector layers CC of the electrode is preferably in the form of a grid. This hence allows obtaining an optimal active electrode volume while guaranteeing a minimum weight.

The porous current collector layers CC are preferably chosen among the materials whose electronic conductivity is good (i.e. >$10^2$ S cm$^{-1}$). Hence, according to a preferred embodiment, the porous current collector layers CC, identical or different, are conductive material layers.

The porous current collector layers CC may be chosen among the non-metallic porous layers (of the conductive carbon felt type) or among the metallic porous layers.

The porous current collector layers CC, identical or different, when they are metallic layers, are in particular metallic conductive material layers such as a carbon fabric further comprising a metal M chosen among aluminium, copper, nickel and one of their mixtures.

By way of example of different porous current collector layers CC, the electrode may comprise porous current collector layers $CC^1$ comprising (or consisting of) a metal $M^1$ and porous current collector layers $CC^{1'}$ comprising (or consisting of) a metal $M^{1'}$, $M^1$ and $M^{1'}$ being different from and having the same definition as M.

The thicknesses of the porous current collector layers CC may be identical or different.

The whole surface of the porous current collector layers CC may be covered with a metallic protective layer.

In particular, the metallic protective layers, identical or different, comprise (or consist of) a metal M' chosen among lead, silver, tin and one of their mixtures.

The metallic protective layers allow protecting the porous current collector layers CC from a potential corrosion, in particular when the electrolyte of the device is a basic aqueous electrolyte.

According to the invention, it is meant by "external layer" a layer that does not constitute an internal layer of the electrode, in particular that constitutes neither an electrode material layer ME interposed between two porous current collector layers CC, nor a porous current collector layer CC interposed between two electrode material layers ME.

The external layer(s) of the electrode that is(are) electrode material layer(s) ME is/are preferably intended to be in contact with the electrolyte of the device.

Is considered as an electrolyte, any liquid or solid substance allowing the passage of the electrical current by ionic displacement.

The porous current collector layer(s) CC is/are intended to ensure the electrical connection of the electrode with the external circuit.

According to a first variant of the invention, the electrode comprises an external layer that is an electrode material layer ME and an external layer that is a porous current collector layer CC.

According to a first variant, the external layer of the electrode consisting of a porous current collector layer CC will not be in direct contact with the electrolyte and the external electrode material layer ME will be in contact with the electrolyte after assembly of the device.

According to this first variant, the electrode may be in the form of an assembly of successive layers having the following structure:

[CC—ME]$_n$ wherein ME is an electrode material layer, CC is a porous current collector layer, 2≤n≤8, and preferably 2≤n≤4.

Consequently, the electrode comprises an external porous current collector layer CC, an external electrode material layer ME and 2n-2 internal layers interposed between said external layers, said internal and external layers comprising n electrode material layers ME and n porous current collector layers CC, said electrode material ME and current collector CC layers being alternated according to the repetition pattern —[CC—ME]— (or —[ME—CC]—).

When the porous current collector layers comprise (or consist of) different metals $M^1$ and $M^{1'}$, the electrode may be in the form of an assembly of successive layers having the following structure:

*[$CC^1$—ME—$CC^{1'}$—ME]$_{n1}$, with 1≤$n_1$≤4, and preferably 1≤$n_1$≤2, ME being an electrode material layer, $CC^1$ being a porous current collector layer comprising (or consisting of) a metal $M^1$, and $CC^{1'}$ being an internal current collector layer comprising (or consisting of) a metal $M^{1'}$; or

*{[$CC^1$—ME]$_{n2}$—[$CC^{1'}$—ME]$_{n3}$}$_u$, with 1≤$n_2$≤7, 1≤$n_3$≤7, 1u≤2, ME being an electrode material layer, $CC^1$ being a porous current collector layer comprising (or consisting of) a metal $M^1$, and $CC^{1'}$ being a porous current collector layer comprising (or consisting of) a metal $M^{1'}$; or

*{[$CC^1$—ME]$_{n4}$—[$CC^{1'}$—ME]$_{n5}$—[$CC^1$—ME]$_{n6}$}$_v$, with 1≤$n_4$≤6, 1≤$n_5$≤6, 1≤$n_6$≤6, 1≤v≤2, ME being an electrode material layer, $CC^1$ being a porous current collector layer comprising (or consisting of) a metal $M^1$, and $CC^{1'}$ being a porous current collector layer comprising (or consisting of) a metal $M^{1'}$.

$M^1$ is preferably more conductive than $M^{1'}$. By way of example, $M^1$ is copper and $M^{1'}$ is nickel.

When the porous current collector layers comprise (or consist of) different metals $M^1$ and $M^{1'}$, the electrode may be in the form of an assembly of successive layers in which the porous current collector layers $CC^1$ and the porous current collector layers $CC^{1'}$ are arranged in a random manner within the electrode (it being understood that the electrode material ME and current collector ($CC^{1'}$ or $CC^1$) layers are alternated according to the repetition pattern —[CC—ME]— (or —[ME—CC]—), with CC=$CC^{1'}$ or $CC^1$).

According to a second variant of the invention, the other external layer of the electrode is an electrode material layer ME. Hence, the electrode comprises two external layers that are electrode material layers ME.

According to this second variant, the electrode comprises no external porous current collector layer(s). In other words, all the porous current collector layers of the electrode are internal layers.

According to this second variant, the electrode may be in the form of an assembly of successive layers having the following structure:

$$ME-[CC-ME]_{p-1}$$

wherein ME is an electrode material layer, CC is a porous current collector layer, $2 \leq p \leq 8$, and preferably $2 \leq p \leq 3$.

In this case, the other external layer of the electrode consisting of an electrode material layer ME will not be in direct contact with the electrolyte after assembly of the device.

Consequently, the electrode comprises two external electrode material layers ME and 2p-3 internal layers interposed between said external layers, said internal and external layers comprising p electrode material layers ME and p-1 porous current collector layers CC, said electrode material ME and current collector CC layers being alternated according to the repetition pattern —[CC—ME]— (or —[ME—CC]—).

When the porous current collector layers comprise (or consist of) different metals $M^1$ and $M^{1'}$, the electrode may be in the form of an assembly of successive layers having the following structure:

*ME–[CC$^1$—ME—CC$^{1'}$—ME]$_{p1}$, with $1 \leq p_1 \leq 4$, and preferably $1 \leq p_1 \leq 2$, ME being an electrode material layer, CC$^1$ being a porous current collector layer comprising (or consisting of) a metal $M^1$, and CC$^{1'}$ being a porous current collector layer comprising (or consisting of) a metal $M^{1'}$; or

*ME–{[CC$^1$—ME]$_{p2}$—[CC$^{1'}$—ME]$_{p3}$}$_q$, with $1 \leq p_2 \geq 7$, $1 \leq p_3 \leq 7$, $1 \leq q \geq 4$, ME being an electrode material layer, CC$^1$ being a porous current collector layer comprising (or consisting of) a metal $M^1$, and CC$^{1'}$ being a porous current collector layer comprising (or consisting of) a metal $M^{1'}$; or

*ME–{[CC$^1$—ME]$_{p4}$—[CC$^1$—ME]$_{p5}$—[CC$^1$—ME]$_{p6}$}$_r$, with $1 \geq p_4 \leq 6$, $1 \leq p_5 \geq 6$, $1 \leq p_6 \leq 6$, $1 \leq r \leq 3$, ME being an electrode material layer, CC$^1$ being a porous current collector layer comprising (or consisting of) a metal $M^1$, and CC$^{1'}$ being a porous current collector layer comprising (or consisting of) a metal $M^{1'}$.

$M^1$ is preferably more conductive than $M^{1'}$. By way of example, $M^1$ is copper and $M^{1'}$ is nickel.

When the porous current collector layers comprise (or consist of) different metals $M^1$ and $M^{1'}$, the electrode may be in the form of an assembly of successive layers in which the porous current collector layers CC$^1$ and the porous current collector layers CC$^{1'}$ are arranged in a random manner within the electrode (it being understood that the electrode material ME and current collector (CC$^{1'}$ or CC$^1$) layers are alternated according to the repetition pattern —[CC—ME]— (or —[ME—CC]—), with CC=CC$^{1'}$ or CC$^1$).

The electrode may be a positive or negative electrode.

Each of the electrode material layers ME comprises at least one electrode active material, possibly a polymer binder and possibly an electronic conductivity agent.

When the electrode is a positive electrode, the active material is a positive electrode active material and, when the electrode is a negative electrode, the active material is a negative electrode active material.

The electrode material layers ME preferably comprise the same electrode active material, in particular when they are of identical compositions.

According to a particular and preferred embodiment of the invention, the electrode is a zinc-based negative electrode. According to this embodiment, the active material of the electrode material layers ME is preferably chosen among calcium zincate or a mixture of zinc oxide and calcium hydroxide or a mixture of zinc and calcium hydroxide.

According to an embodiment of the invention, each of the electrode material layers ME has a thickness varying from about 20 μm to 2 mm, and preferably from about 50 μm to 500 μm.

The thicknesses of the electrode material layers ME may be identical or different, and preferentially identical.

The electrode according to the present invention may be easily manufactured by any type of method for applying an electrode material layer as an ink or a paste comprising at least one positive or negative electrode active material, at least one solvent, possibly at least one polymer binder and possibly an electronic conductivity agent, on a porous current collector layer CC. Among such methods, it may be mentioned in particular coating, soaking, spraying, printing, etc . . .

The electrode comprises in particular several electrode material layers ME and several internal and porous current collector layers CC. In particular, the external layer intended to be placed into contact with the electrolyte is an electrode material layer ME. According to an example, none of the current collector layers is in contact with the electrolyte.

The electrode is intended to be arranged in a rechargeable energy storage device comprising the electrode, a counter-electrode, in particular of inverse charge with respect to the electrode, and the electrolyte. The external layer of the electrode that is an electrode material layer ME is intended to face an external layer of the counter-electrode. In particular, the external electrode material layer EM of the electrode is intended to be in direct contact with the electrolyte.

The invention has for second object a rechargeable energy storage device comprising:
    at least one positive electrode,
    at least one negative electrode,
    an electrolyte,
    said device being characterized in that at least one of the positive or negative electrodes is an electrode according to the first object of the invention.

According to a preferred embodiment of the invention, the electrolyte is in direct contact with the electrolyte as defined in the first object of the invention, through the external layer that is an electrode material layer ME of said electrode.

In particular, the electrolyte of the device is not in direct contact with the porous current collector layers CC of the electrode according to the first object of the invention. This hence allows avoiding, or at least reducing, the formation of dendrites, and avoiding a short-circuit within the device. Indeed, the porous current collector layers being very conductive, their direct contact with the electrolyte may lead, from the first charge, to unsaturation of the electrolyte and increase of the electrode thickness, inducing the formation of dendrites, the perforation of the separator and potentially a short-circuit after 1 or 2 cycles.

The device may further comprise at least one glassy carbon element in direct contact with the other of the two external layers of the electrode, and in particular with the external layer intended to ensure the electrical connection of the electrode with the external circuit. Consequently, the electrical connection of the electrode with the external circuit is made through said element. This hence allows avoiding a potential contact between said other one of the two external layers of the electrode and the electrolyte within the device, in particular when said other one of the two external layers of the electrode is a porous current collector layer CC.

The device may in particular be chosen among an alkaline accumulator, a lithium-ion battery, a lead battery, a nickel-metal hydride or Ni-MH battery and a supercapacitor.

Conventionally, and as a function of the type of device, the electrolyte may be liquid, gel or solid.

According to a preferred embodiment of the invention, the device is an alkaline accumulator chosen among a zinc/air battery and a zinc/nickel battery, and preferably a zinc/nickel battery.

The alkaline accumulator is defined as being a rechargeable energy storage device comprising:
at least one positive electrode,
at least one negative electrode,
a liquid electrolyte,
one or several porous separators.

When the alkaline accumulator is a zinc/nickel battery, the negative electrode of the device is a zinc-based electrode as defined in the first object of the invention.

In this embodiment, the positive electrode may be a nickel-based electrode, comprising in particular, as an active material, nickel oxide (III) (NiOOH), nickel hydroxide (II) ($Ni(OH)_2$), or one of their mixtures.

The porous separator may be a non-electronically conductive porous material, generally a polyolefin-based polymer material (for example, polyethylene) or fibres (for example, glass fibres or wood fibres, cellulosic fibres).

The electrode according to a first object of the invention may comprise edges (upper, lower or circular) intended to ensure the electrical connection with the external circuit. These edges may then be covered with an insulating material, such as polytetrafluorethylene (PTFE). This hence allows insulating, within the device, the parts of the electrode that are not intended to be in contact with the electrolyte.

The device in accordance with the invention may be easily assembled by any technique known by the one skilled in the art.

The invention has for third object the use of an electrode according to the first object of the invention to improve the energy density of a rechargeable energy storage device.

The invention has for fourth object the use of an electrode according to the first object of the invention in an alkaline accumulator.

The alkaline accumulator is as defined in the second object of the invention as being a rechargeable energy storage device characterized in that at least one of the positive or negative electrodes is an electrode according to the first object of the invention.

DESCRIPTION OF THE PREFERRED EMBODIMENTS

The present invention is illustrated by the following examples, to which it is however not limited.

EXAMPLES

The raw materials used in the examples are listed hereinafter:
polyvinyl alcohol, Fluka, molar mass $M_w=72000$,
titanium nitride, EASYL, purity of 99%,
nickel-oxide positive electrode recovered from the disassembly of a PKcell-brand Ni—Zn battery),
nickel hydroxide (II) ($Ni(OH)_2$), of battery grade,
potassium hydroxide (KOH), Alfa Aesar, purity of 85%,
lithium hydroxide (LiOH), Normapur, purity of 96%,
zinc oxide (ZnO), a.m.p.e.r.e. industrie, purity of 99,9%,
calcium zincate, EASYL, purity of 99%,
polytetrafluorethylene (PTFE), ROTH, Seal Tape Grade L,
non-woven, polyolefin-based separator, Viledon, Freudenberg, FS 2203-10,
polypropylene membrane, Celgard® 3401,
porous current collector layer in the form of a circular copper foam, GoodFellow, CU003804, (thickness reduced to 800 μm),
porous current collector layer in the form of a circular copper grid, Alfa Aesar, with copper wires of diameter 56 μm, ref. 46603,
porous current collector layer consisting of a nickel foam recovered from the disassembly of a PKcell-brand Ni—Zn battery.

Unless otherwise mentioned, all the materials have been used as received from the manufacturers.

Example 1: Preparation of Electrode E-A not in Accordance with the Invention and of Two Electrodes E-1 and E-2 in Accordance with the Invention An electrode material ink comprising 900 mg of calcium zincate as an active material, 42 mg of bismuth oxide and 144 mg of titanium nitride as conductive additives, 66 mg of polyvinyl alcohol as a polymer binder and 1.90 ml of water has been prepared.

The calcium zincate has been synthetized by a hydro-micromechanical method as described in the International Application WO 2016/156749 A1. The size distribution of the calcium zincate particles, measured by LASER granulometry (liquid process), was such that $d_{50}=10\pm2$ μm.

This ink has thereafter been applied to one of the main faces of an 800 μm-thick porous current collector layer consisting of a circular copper foam to form a circular electrode E-A. The obtained circular electrode E-A has then been dried at about 50° C. in an oven, placed into a PTFE ring and squeezed until reaching a thickness of about 0.5 mm. The PTFE ring protected the circular edges of the electrode, while always leaving a central electrolyte—electrode contact surface.

The circular electrode E-A comprised a current collector layer CC and an electrode material layer ME deposited on the current collector layer CC. It was hence in the form of an assembly of successive layers having the following structure:

[CC-ME]

An electrode material ink comprising 450 mg of calcium zincate as an active material, 21 mg of bismuth oxide and 72 mg of titanium nitride as conductive additives, 33 mg of polyvinyl alcohol as a polymer binder and 1.90 ml of water has been prepared.

A first deposit using the ink as prepared hereinabove has then been applied to a first 100 μm-thick porous current collector layer CC consisting of a circular copper grid.

A second deposit using the ink as prepared hereinabove has been applied to a second 100 μm-thick porous current collector layer CC consisting of a circular copper grid having a diameter higher than the deposit. The two porous current collector layers CC, each covered with an electrode material ink, have then been dried at about 50° C. in an over, and assembled so as to place the first electrode material layer ME into contact with the second current collector layer CC, to form a circular electrode E-1. According to FIG. 1, it can be noted that the current collector CC 1' having a diameter higher than the deposit and used in the second deposit is folded over the first current collector CC 1, used for the first deposit, so that these two latter ones are in contact. The obtained circular electrode 3 E-1 has then been placed into a PTFE ring 2 and squeezed until reaching the thickness of about 0.5 mm. The PTFE ring 2 protected the circular edges of the electrode, while always leaving a central electrolyte—electrode contact surface 4.

The circular electrode E-1 comprised successively a first porous current collector layer CC 1, a first electrode material layer ME 5, a second porous current collector layer CC 1' connected to the first porous current collector layer CC 1 and a second electrode material layer ME 5'. The second electrode material layer ME 5' being intended to be in contact with the electrolyte and the first porous current collector layer 1 being intended to ensure the electrical connection of the electrode 3 with the external circuit (not shown). The electrode 3 was hence in the form of an assembly of successive layers having the following structure:

$$[CC—ME]_2$$

An electrode material ink comprising 300 mg of calcium zincate as an active material, 14 mg of bismuth oxide and 48 mg of titanium nitride as conductive additives, 22 mg of polyvinyl alcohol as a polymer binder and 1.90 ml of water has been prepared.

The calcium zincate has been synthetized by a method as described hereinabove.

A first deposit using the ink as prepared hereinabove has then been applied to a first 100 μm-thick porous current collector layer CC consisting of a circular copper grid.

A second deposit using the ink as prepared hereinabove has been applied to a second 100 μm-thick porous current collector layer CC consisting of a circular copper grid having a diameter higher than the deposit.

Figure 2:
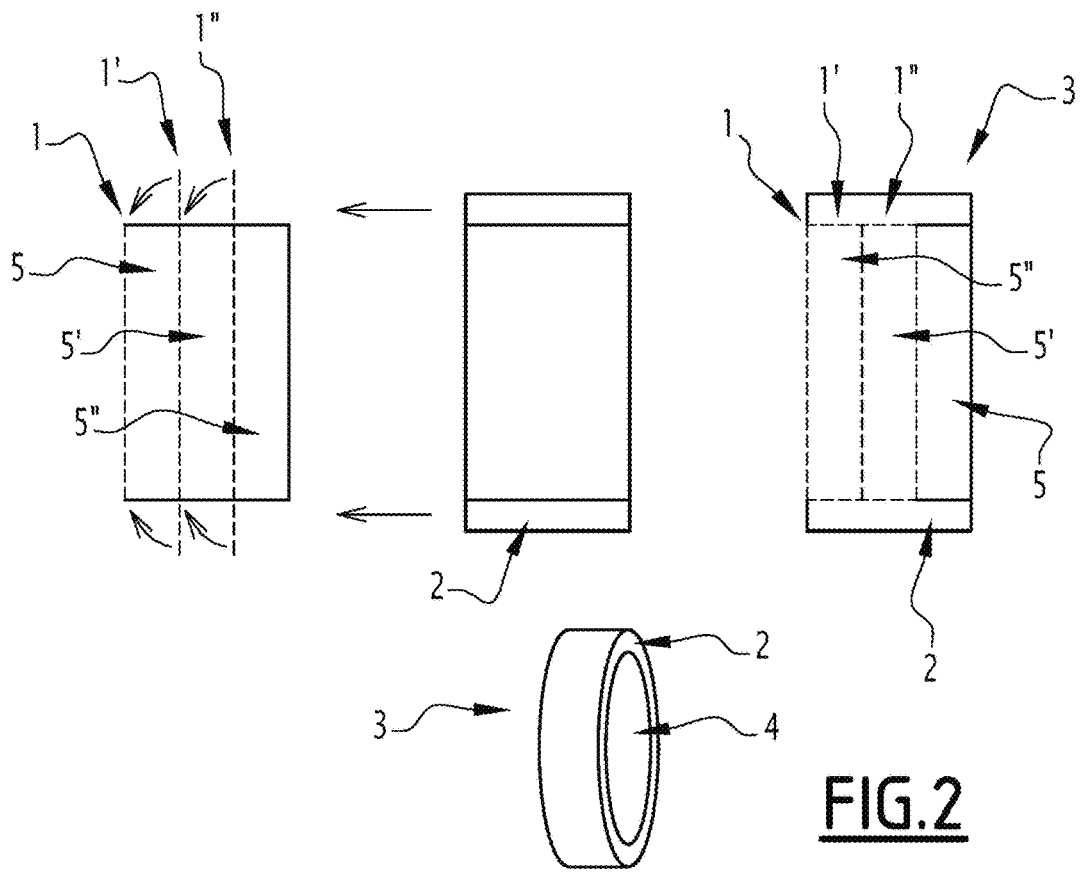

A second deposit using the ink as prepared hereinabove has been applied to a third 100 μm-thick porous current collector layer CC consisting of a circular copper grid having a diameter higher than the deposit. The three porous current collector layers CC, each covered with an electrode material ink, have then been dried at about 50° C. in an oven, and assembled so as to place the first electrode material layer ME into contact with the second porous current collector layer CC and the second electrode material layer ME with the third porous current collector layer CC, to form an electrode E-2. According to FIG. 2, it can be noted that the current collectors CC having a diameter higher than the deposit 1', 1" are folded over the first current collector CC 1, used for the first deposit, so that these three latter ones are in contact. The obtained electrode 3 E-2 has then been placed into a PTFE ring 2 and squeezed until reaching the thickness of about 0.5 mm. The PTFE ring 2 protected the circular edges of the electrode, while always leaving a central electrolyte—electrode contact surface 4.

The circular electrode E-2 3 comprised successively a first porous current collector layer CC 1, a first electrode material layer ME 5, a second porous current collector layer CC 1', a second electrode material layer ME 5', a third porous current collector layer CC 1" and a third electrode material layer ME 5", the third electrode material layer 5" being intended to be in contact with the electrolyte and the first porous current collector layer 1 being intended to ensure the electrical connection of the electrode 3 with the external circuit (not shown). The electrode 3 was hence in the form of an assembly of successive layers having the following structure:

$$[CC—ME]_3$$

Three zinc/nickel alkaline accumulators have then been manufactured by assembling:
one of the zinc-based negative electrodes E-A, E-1 or E-2,
a nickel-based positive electrode recovered from a PKcell-brand Ni—Zn battery of the market, comprising an electrode material layer comprising NiOOH and Ni(OH)$_2$, deposited on a porous current collector layer consisting of a nickel foam,
a polyolefin-based non-woven separator and a polypropylene membrane interposed between the negative and positive electrodes, the separator facing the negative electrode, and the membrane facing the positive electrode, and
an electrolyte comprising an aqueous solution comprising KOH 7 M and 10 g/l of LiOH, said aqueous solution being saturated in ZnO.

Figure 3A:
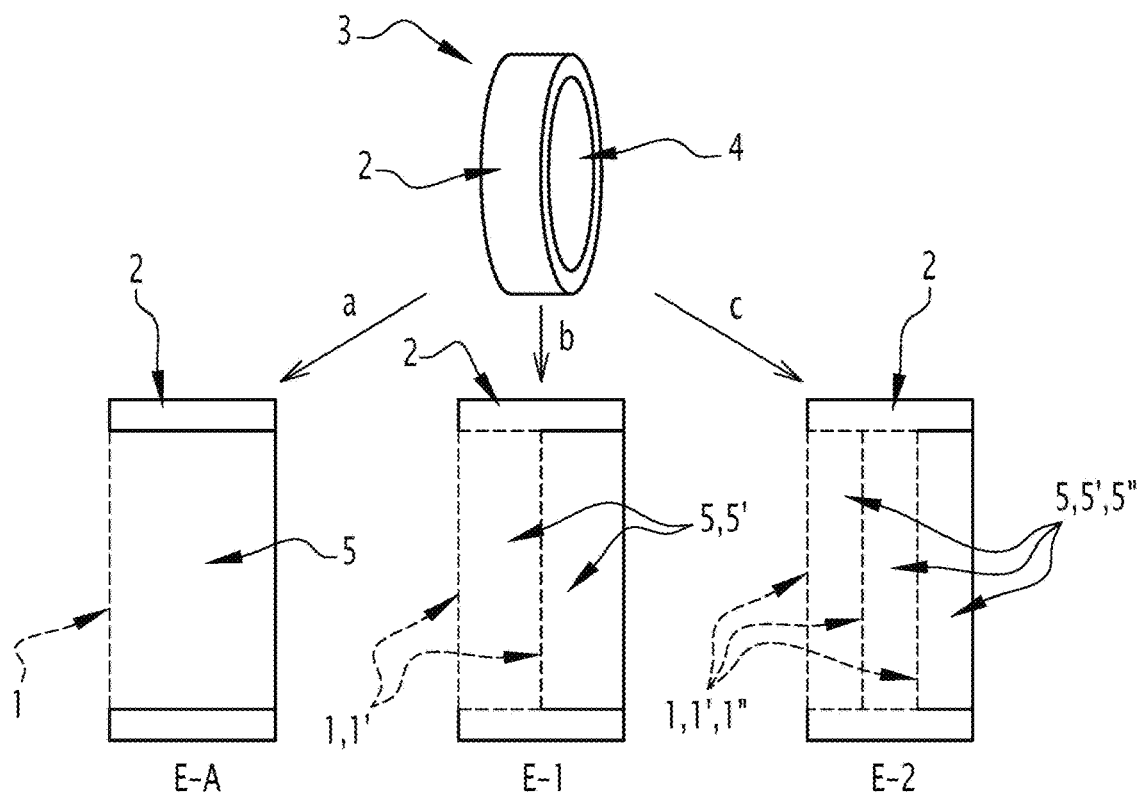
Figure 3B:
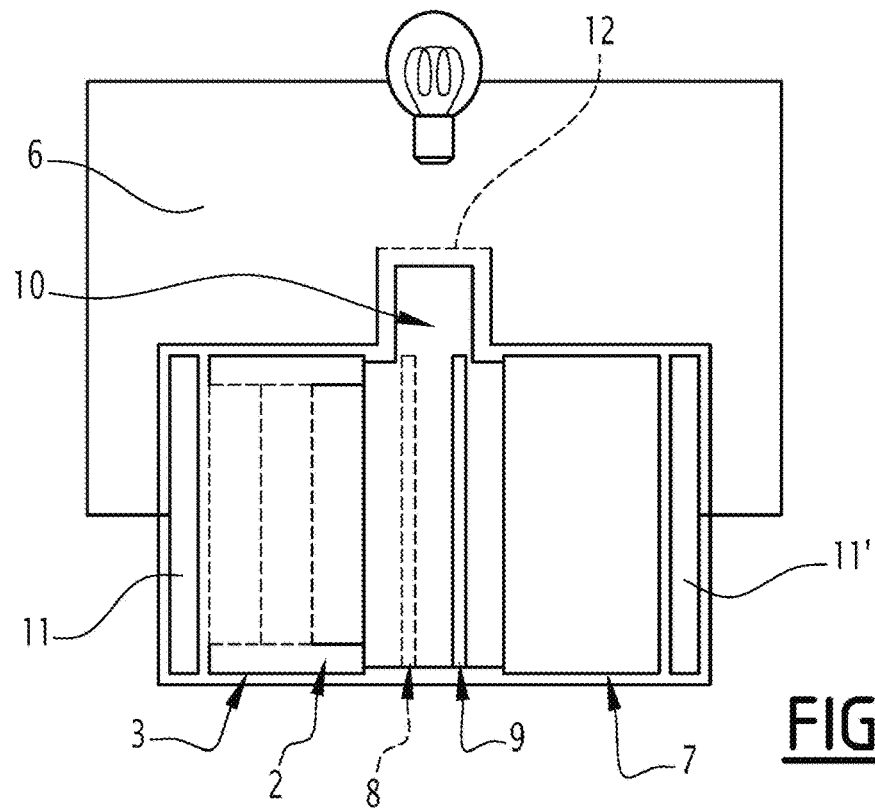

FIG. 3.a. shows the zinc-based negative electrodes E-A (FIG. 3.a.), E-1 (FIG. 3.b.) and E-2 (FIG. 3.c.) as prepared hereinabove.

FIG. 3.b. shows an accumulator 6 as manufactured hereinabove, comprising a zinc-based negative electrode 3, a nickel-based positive electrode 7, a polyolefin-based non-woven separator 8 and a polypropylene membrane 9 interposed between the negative 3 and positive 7 electrodes, the separator 8 facing the negative electrode 3, and the membrane 9 facing the positive electrode 7, and an electrolyte 10.

The accumulator also comprises two glassy carbon layers 11, 11' at its two ends, allowing the direct electrical contact with the external porous current collector layers, as well as a security system that is permeable to the gases but not to the liquid electrolyte 12 in order to avoid a potential overpressure in case of gassing.

The assembly of the electrode 3 provided with its PTFE ring 2 to the external current collector allows avoiding the direct contact with the external porous current collector layer of the negative electrode and the electrolyte.

Galvanostatic charge and discharge tests (with constant current) at C/3 (i.e. 3 h of charge and 3 h of discharge with a current of 1.33 mA) with a cut-off voltage of 1.93 V in charge and an end-of-discharge voltage of 1.40 V have then been carried out, i.e. with a practical capacity of 4 mAh that corresponds to 40% of the theoretical capacity. The tests have been carried out at ambient temperature with a potentiostat-galvanostat sold under the commercial name OGF500 by the Origalys Company. Previously to the cycling at C/3, 3 cycles of charge at C/10 and discharge at C/5 have been carried out.

Figure 5A:
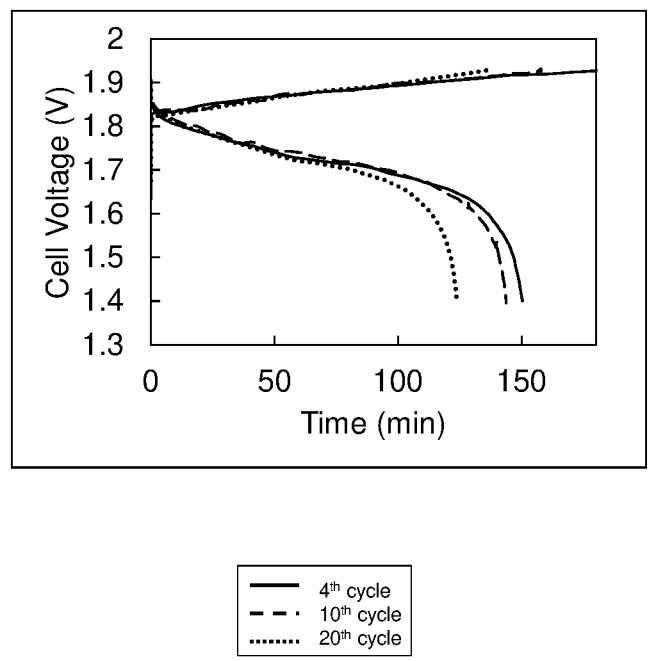
Figure 5B:
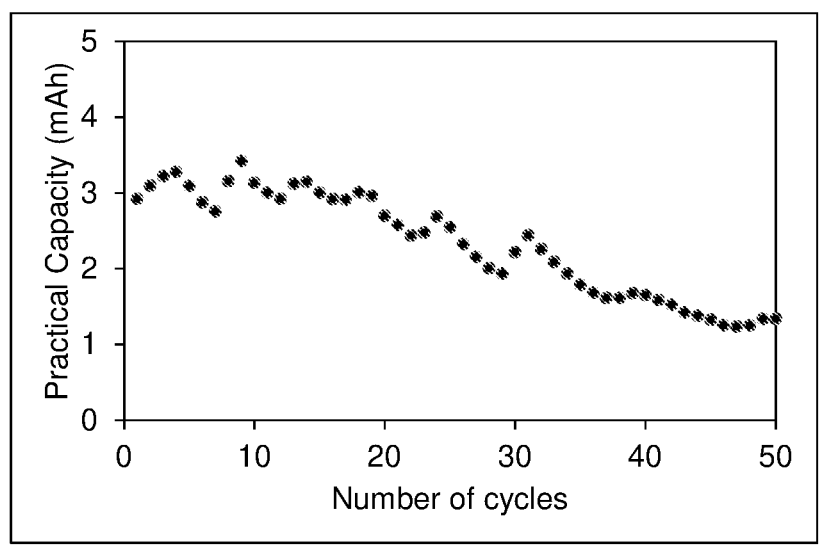
Figure 6A:
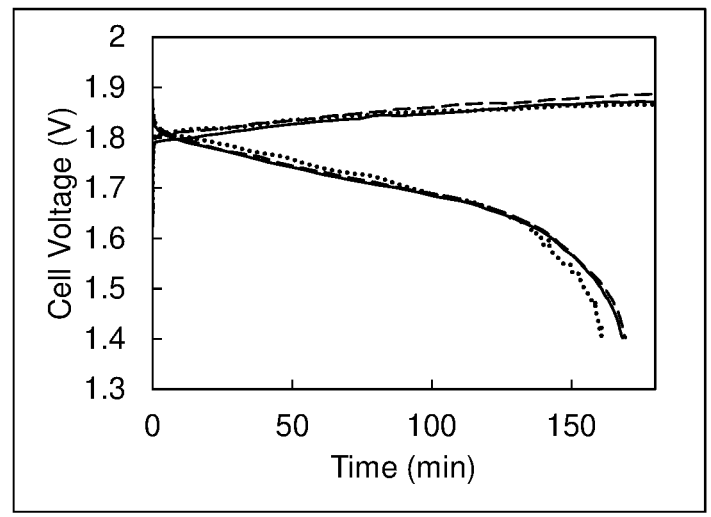
Figure 6B:
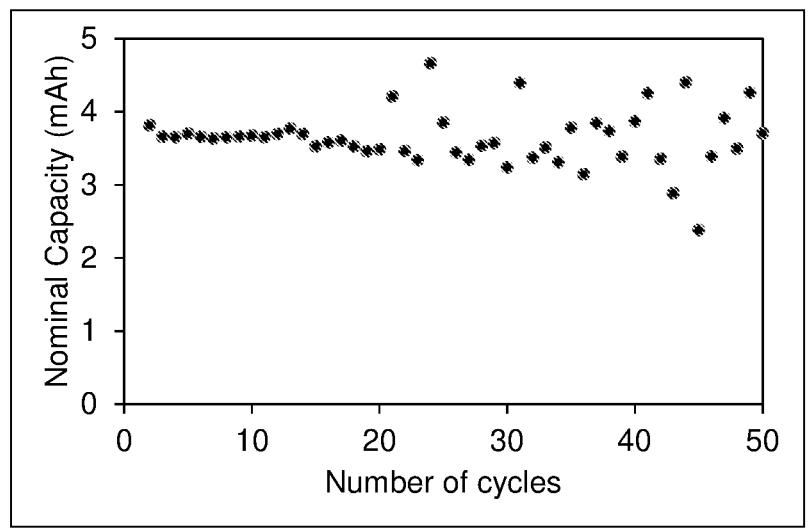

FIG. 4.a., FIG. 5.a. and FIG. 6.a. show curves of the accumulator voltage (in volts, V) as a function of time (in minutes, min) after 4 cycles (i.e. after the 3 formation cycles +1 cycle at C/3) (full line curve), after 10 cycles (long-dash line curve) and after 20 cycles (short-dash line curve) when the accumulator comprises the electrode E-A (FIG. 4.a.), the electrode E-1 (FIG. 5.a.) or the electrode E-2 (FIG. 6.a), as a negative electrode.

FIG. 4.b., FIG. 5.b. and FIG. 6.b. show the evolution of the accumulator practical capacity (in milliampere hour, mAh) as a function of the number of cycles when the accumulator comprises the electrode E-A (FIG. 4.b.), the electrode E-1 (FIG. 5.b.) or the electrode E-2 (FIG. 6.b), as a negative electrode.

It can be observed that, when a negative electrode not in accordance with the invention E-A is used, an overvoltage is observed at the 10$^{th}$ cycle, leading the battery to reach the cut-off voltage in less than 100 min of charge and at the 20$^{th}$ cycle in less than 50 min of charge (FIG. 4.a.). This also results in a high drop of the practical capacity (FIG. 4.b.) right from the first cycles. The average practical capacity of this electrode E-A for the first 50 cycles was of 1.27 mAh, which represents only 32% of the initial practical capacity of 4 mAh.

In FIG. 5.a., the electrochemical performances are improved. Hence, with a negative electrode in accordance with the invention E-1 in which two porous current collector layers are used, the overvoltage at the 10$^{th}$ and the 20$^{th}$ cycles is less pronounced. A very moderate reduction of the practical capacity is also observed (FIG. 5.b.). The average practical capacity of this electrode E-1 for the first 50 cycles was of 2.3 mAh, which represents 58% of the initial practical capacity of 4 mAh.

The electrochemical performances are further improved when the number of porous current collector layers increases. Hence, with a negative electrode in accordance with the invention E-3 in which three porous current collector layers are used, the overvoltage at the 10$^{th}$ and the 20$^{th}$ cycles is low (FIG. 6.a.). A very low reduction of the practical capacity is also observed (FIG. 6.a.). Indeed, the average practical capacity of this electrode E-3 for the first 50 cycles was of 3.68 mAh, which represents 92% of the initial practical capacity of 4 mAh.

Morphological analyses by scanning electron microscopy of the electrodes E-A, E-1 and E-2, after cycling, have allowed showing that the use of a current collection multiple array internal to the electrode allows favouring the uniform zinc redistribution during the formation thereof within the electrode during the successive cycles.

Example 2: Preparation of an Electrode E-B not in Accordance with the Invention

An electrode material ink comprising 450 mg of calcium zincate as an active material, 21 mg of bismuth oxide and 72 mg of titanium nitride as conductive additives, 33 mg of polyvinyl alcohol as a polymer binder and 1.90 ml of water has been prepared.

The calcium zincate has been synthetized by a method as described hereinabove.

A first deposit using the ink as prepared hereinabove has then been applied to a first 100 μm-thick porous current collector layer CC consisting of a circular copper grid.

A second deposit using the ink as prepared hereinabove has been applied to a second 100 μm-thick porous current collector layer CC consisting of a circular copper grid having a diameter higher than the deposit. The two porous current collector layers CC, each covered with an electrode material ink, have then been dried at about 50° C. in an oven, and assembled so as to place the first electrode material layer ME into contact with the second current collector layer CC. A third porous current collector layer CC, having a diameter higher than the second electrode material layer ME, has been applied to the second electrode material layer ME, to form a circular electrode E-B. According to the appended FIG. 7, it can be noted that the current collectors CC having higher diameters than the deposit 1', 1" are folded over the first current collector CC 1, so that these three latter ones are in contact. The obtained circular electrode 3 E-B has then been placed into a PTFE ring 2 and squeezed until reaching the thickness of about 0.5 mm. The PTFE ring 2 protected the circular edges of the electrode 3, while always leaving a central surface 4 of contact with the electrolyte. In this case, the porous current collector layer CC is in direct contact with the electrolyte.

The circular electrode E-B comprised successively a first porous current collector layer CC 1, a first electrode material layer ME 5, a second porous current collector layer CC 1' connected to the first porous current collector layer CC 1, a second electrode material layer ME 5' and a third porous current collector layer CC 1" connected to the first porous current collector layer CC 1. The third porous current collector layer CC 1" being intended to be in contact with the electrolyte and the first porous current collector layer 1 being intended to ensure the electrical connection of the electrode 3 with the external circuit. The electrode 3 was hence in the form of an assembly of successive layers having the following structure:

[CC—ME]$_2$—CC

A zinc/nickel alkaline accumulator has then been manufactured by assembling:
the zinc-based negative electrode E-B,
a positive electrode of the market, recovered from a PKcell-brand Ni-Zn battery of the market, comprising an electrode material layer comprising NiOOH and Ni(OH)$_2$, deposited on a porous current collector layer consisting of a nickel foam,
a polyolefin-based non-woven separator and a polypropylene membrane interposed between the negative and positive electrodes, the separator facing the negative electrode, and the membrane facing the positive electrode, and
an electrolyte comprising an aqueous solution comprising KOH 7M and 10 g/l of LiOH, said aqueous solution being saturated in ZnO.

The so-obtained negative electrode 3 E-B has hence been placed into an accumulator according to the same assembly as that shown in the appended FIG. 3.d.

Galvanostatic charge and discharge tests (with constant current) at C/3 (i.e. 3 h of charge and 3 h of discharge with a current of 1.3 mA) with a cut-off voltage of 1.93 V in charge and an end-of-discharge voltage of 1.40 V have then been carried out, with a practical capacity of 4 mAh that corresponds to 40% of the theoretical capacity. The tests have been carried out at ambient temperature with a potentiostat-galvanostat sold under the commercial name OGF500 by the Origalys Company. Previously to the cycling at C/3, 3 cycles of charge at C/10 and discharge at C/5 have been carried out.

Figure 8A:
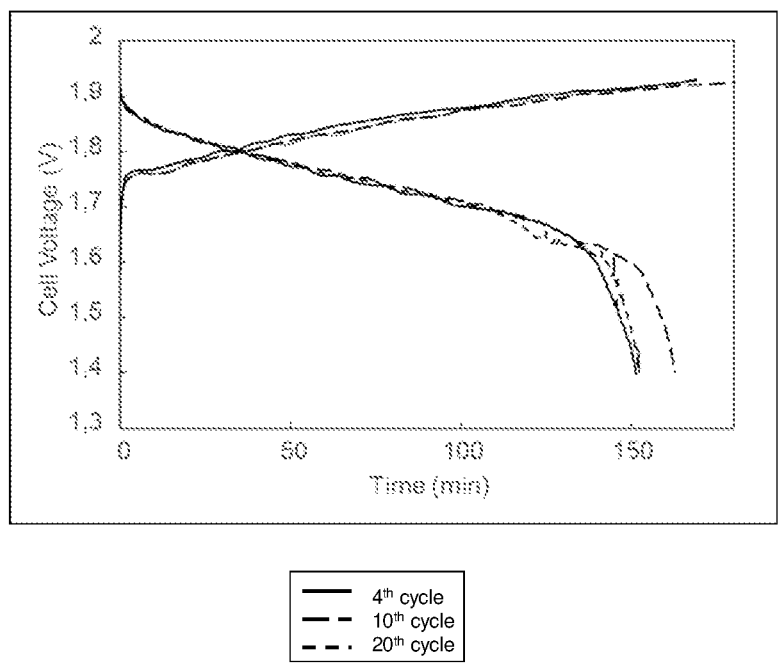
Figure 8B:
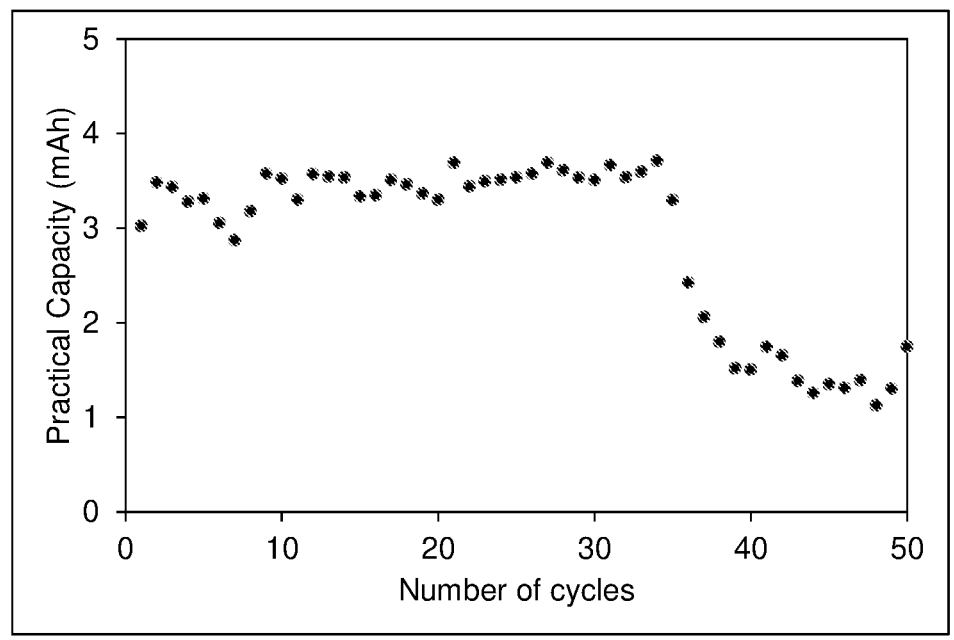

FIG. 8.a. shows the curves of the accumulator voltage (in volts, V) as a function of time (in minutes, min) after 4 cycles (full line curve), after 10 cycles (long-dash line curve) and after 20 cycles (short-dash line curve) when the accumulator comprises the electrode E-B as a negative electrode. The accumulator voltage curves over the first 20 cycles show no overvoltage, which is a result similar to that of the electrode E-2 having the same number of porous current collector layers CC.

FIG. 8.b. shows the evolution of the accumulator practical capacity (in milliampere hour, mAh) as a function of the number of cycles when the accumulator comprises the electrode E-B as a negative electrode.

It can be observed that, when a negative electrode not in accordance with the invention E-B is used, a drastic drop of the capacity has been observed from the 35$^{th}$ cycle.

The average practical capacity of this electrode E-A for the first 50 cycles was of 2.88 mAh, which represents only 72% of the initial practical capacity of 4 mAh.

Although the accumulator voltage curves measured up to the 20$^{th}$ cycle do not alone explain the performance losses of an electrode not in accordance with the invention E-B, the morphological analyses by scanning electron microscopy of the electrodes E-B, after cycling, have allowed showing that the use of an internal current collection multiple array allows favouring the uniform zinc redistribution during the formation thereof within the electrode during the successive cycles but that the external porous current collector layer CC, in direct contact with the electrolyte, is harmful for the good electrochemical performances, leading to the formation of a resistive layer of calcium hydroxide at the surface.

Example 3: Preparation of an Electrode E-3 in Accordance with the Invention

An electrode material ink comprising 300 mg of calcium zincate as an active material, 14 mg of bismuth oxide and 48 mg of titanium nitride as conductive additives, 22 mg of polyvinyl alcohol as a polymer binder and 1.90 ml of water has been prepared.

The calcium zincate has been synthetized by a method as described hereinabove.

According to the appended Fig.9, a first deposit 5 using the ink as prepared hereinabove has then been applied to a first 100 μm-thick porous current collector layer CC 1 consisting of a circular copper grid having a diameter higher than the deposit.

A second deposit 5' using the ink as prepared hereinabove has been applied to a non-adhesive surface 13 in order to use it without any porous current collector layer CC.

Figure 9:
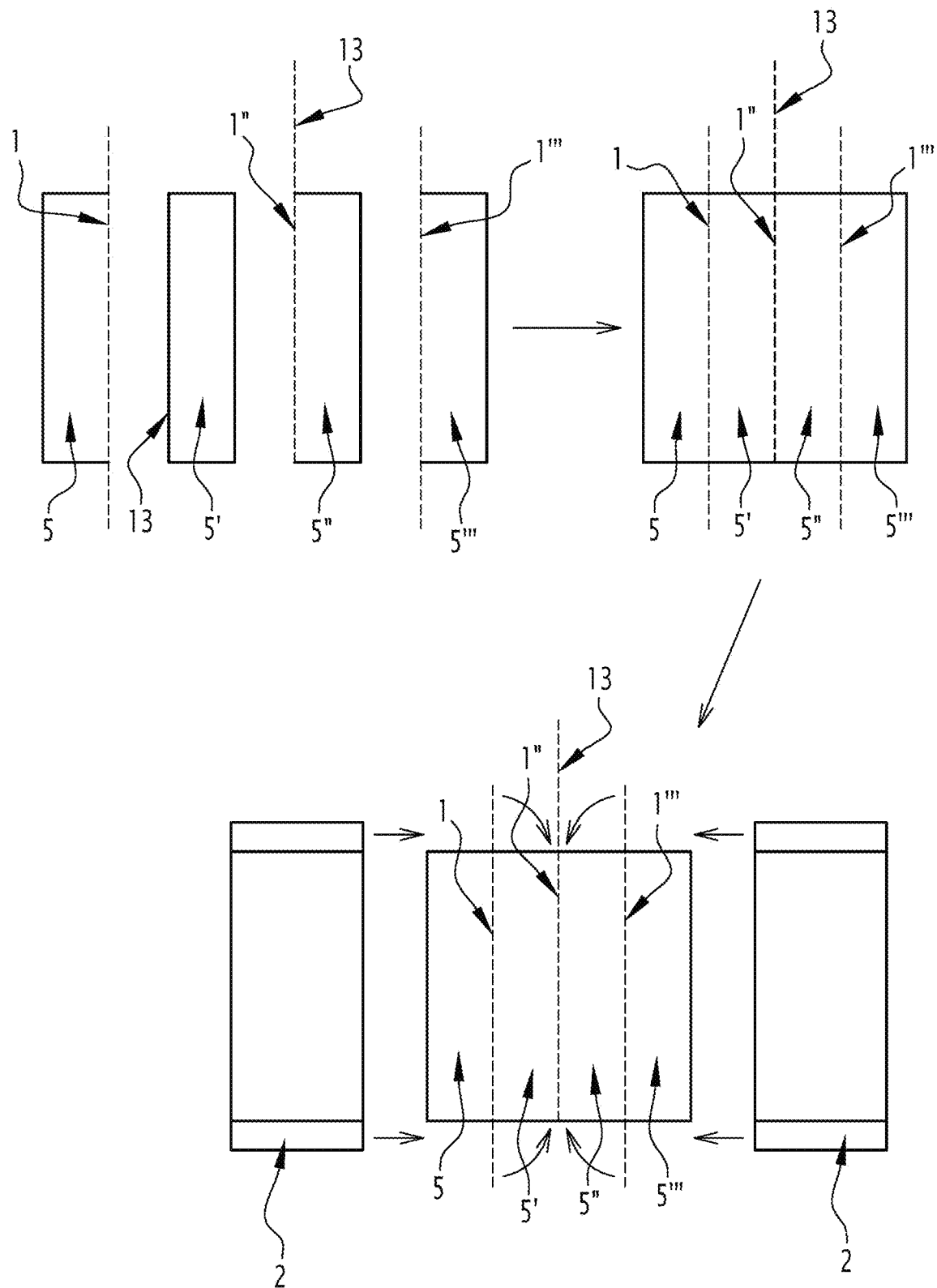

A third deposit 5" using the ink as prepared hereinabove has been applied to a 100 pm-thick third porous current collector layer CC 1" consisting of a circular copper grid comprising an upper extension 13 as illustrated in FIG. 9.

A fourth deposit 5''' using the ink as prepared hereinabove has been applied to a non-adhesive support.

The three porous current collector layers CC 1, 1" and 1''', each covered with an electrode material ink 5, 5' and 5''', as well as the non-adhesive surface 14 covered with an electrode material ink 5' have then been dried at about 50° C. in an oven, and assembled so as to place the first porous current collector layer CC 1 of the first deposit 5 into contact with the electrode material layer ME 5' without current collector, the latter being in contact with the porous current collector layer CC 1" of the third deposit, the electrode material layer ME 5" of the third deposit being in contact with the porous current collector layer 1''' of the fourth deposit 5''' to form a circular electrode 3 E-3. It can be noted that the current collectors CC 1", 1''', having diameters higher than the deposits, are folded over the first current collector CC 1, so that these three latter ones 1, 1" and 1''' are in contact. As shown in the appended FIG. 10, the obtained circular electrode 3 E-3 has then been placed into two PTFE rings 2 and squeezed until reaching the thickness of 800 μm. The two PTFE rings 2 protected the circular edges of the electrode 3, while always leaving two central electrolyte—electrode contact surfaces 4, 4'.

According to the appended Fig.10, the circular electrode 3 E-3 comprised successively a first electrode material layer ME 5, a first porous current collector layer CC 1 connected to the second porous current collector layer CC 1", a second electrode material layer ME 5', a second porous current collector layer CC 1" provided with an upper extension 13 intended to ensure the electrical connection of the electrode 3 with the external circuit, a third electrode material layer ME 5", a third porous current collector layer CC 1''' connected to the second porous current collector layer CC 1", a fourth electrode material layer ME 5'''. The first electrode material layer ME 5 as well as the fourth electrode material layer ME 5''' are intended to be in contact with the electrolyte. The electrode 3 was hence in the form of an assembly of successive layers having the following structure:

ME—[CC—ME]$_3$

A zinc/nickel alkaline accumulator 6 has then been manufactured, according to FIG. 11, by assembling:
- the zinc-based negative electrode 3 E-3,
- two nickel-based positive electrodes 7, 7', recovered from a PKcell-brand Ni—Zn battery of the market, comprising an electrode material layer comprising NiOOH and Ni(OH)$_2$, deposited on a porous current collector layer consisting of a nickel foam,
- two polyolefin-based non-woven separators 8, 8' and two polypropylene membranes 9, 9' interposed between the positive electrodes 7, 7' and the negative electrode 3, the separators 8, 8' facing the negative electrode 3, and the membranes 9, 9' facing the positive electrodes 7, 7', and
- an electrolyte comprising an aqueous solution comprising KOH 7M and 10 g/l of LiOH, said aqueous solution being saturated in ZnO.

FIG. 11 shows the accumulator 6 as manufactured hereinabove, comprising a zinc-based negative electrode 3, two nickel-based positive electrodes 7, 7', two polyolefin-based non-woven separators 8, 8' and two polypropylene membranes 9, 9' interposed between the negative 3 and the positive 7, 7' electrodes, the separators 8, 8' facing the negative electrode 3, and the membranes 9, 9' facing the positive electrodes 7, 7'.

The accumulator also comprises, at its two ends, two polychlorotrifluoroethylene tips (Kel-F®) 15, 15' provided with glassy carbon rods 16, 16' allowing the direct electrical contact with the two nickel-based positive electrodes 7, 7'.

The negative electrode 3 is connected to the external current collector by the extension 13 of this current collector.

Galvanostatic charge and discharge tests (with constant current) at C/3 (i.e. 3 h of charge and 3 h of discharge with a current of 1.3 mA) with a cut-off voltage of 1.93 V in charge and an end-of-discharge voltage of 1.40 V have then been carried out, i.e. with a practical capacity of 4 mAh that corresponds to 40% of the theoretical capacity. The tests have been carried out at ambient temperature with a potentiostat-galvanostat sold under the commercial name OGF500 by the Origalys Company. Previously to the cycling at C/3, 3 cycles of charge at C/10 and discharge at C/5 have been carried out.

Figure 12A:
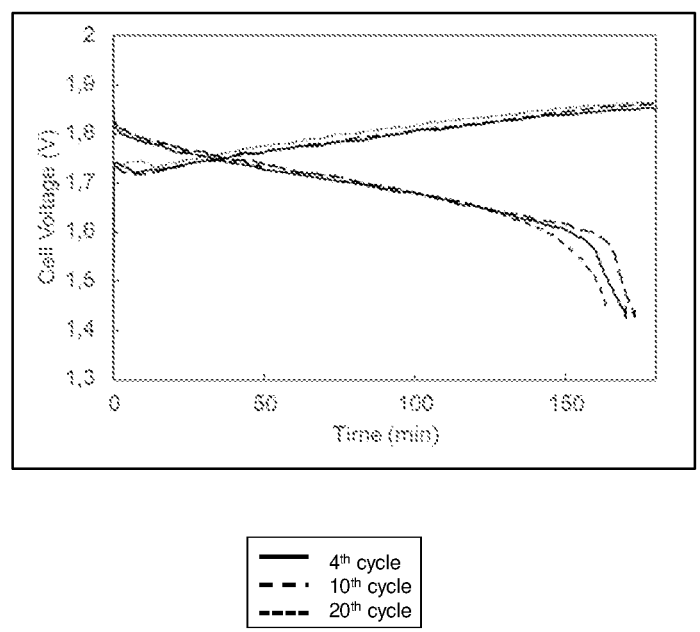
Figure 12B:
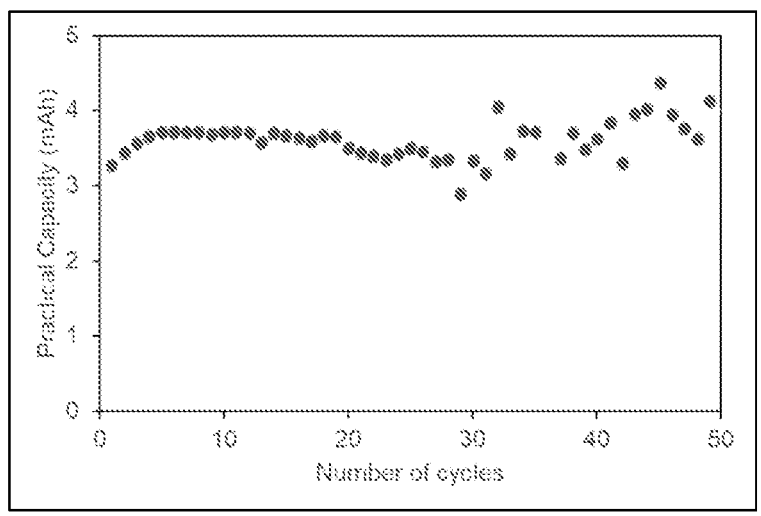

FIG. 12.a. shows curves of the accumulator voltage (in volts, V) as a function of time (in minutes, min) after 4 cycles (full line curve), after 10 cycles (long-dash line curve) and after 20 cycles (short-dash line curve) when the accumulator comprises the electrode E-3 as a negative electrode.

FIG. 12.b. shows curves of the evolution of the accumulator practical capacity (in milliampere hour, mAh) as a function of the number of cycles when the accumulator comprises the electrode E-3 as a negative electrode.

It may be observed that, when a negative electrode in accordance with the invention E-3 is used, the accumulator voltage curves reveal no overvoltage at the 4$^{th}$, 10$^{th}$ and 20$^{th}$ cycles.

It may be observed that, when a negative electrode in accordance with the invention E-3 is used, the practical capacity is held constant over the 50 cycles performed.

The practical practical capacity of this electrode E-3 for the first 50 cycles was of 3.70 mAh, which represents 93% of the initial practical capacity of 4 mAh.

Morphological analyses by scanning electron microscopy of the electrode E-3, after cycling, have allowed showing that the use of an internal current collection multiple array allows favouring the uniform zinc redistribution during the formation thereof within the electrode during the successive cycles.

The invention claimed is:

1. A rechargeable energy storage device comprising:
   an electrolyte; and
   a negative electrode comprising:
      a first external layer that is a first electrode material layer ME and a second external layer that is either a second electrode material layer ME or a current collector layer CC, and
      two or more internal layers interposed between the first and second external internal layers, said internal layers comprising one or more electrode material layers ME and one or more porous current collector layers CC,
   wherein said electrode material ME and current collector CC layers forming the first and second external layers and the internal layers are alternated according to the repetition pattern —[CC—ME]—, and
   wherein the first external layer that is a first electrode material layer ME is configured to be in contact with the electrolyte.

2. The rechargeable energy storage device according to claim 1, wherein the negative electrode has a thickness ranging from 50 μm to 4 mm.

3. The rechargeable energy storage device according to claim 1, wherein at least a part or each of the one or more porous current collector layers CC of the negative electrode is one of a grid, a perforated sheet, a felt, a meshing, a fabric, and a foam.

4. The rechargeable energy storage device according to claim 1, wherein the porous current collector layers CC of the negative electrode, that are identical or different, are conductive material layers.

5. The rechargeable energy storage device according to claim 1, wherein said second external layer of the negative electrode is a porous current collector layer CC, and
   wherein said negative electrode is in the form of an assembly of successive layers having the following structure:

$[CC—ME]_n$ wherein ME is one or more of the electrode material layers, CC is one or more of the porous current collector layers, and $2 \leq n \leq 8$.

6. The rechargeable energy storage device according to claim 1, wherein the second external layer of the negative electrode is the second electrode material layer ME, and said negative electrode is in the form of an assembly of successive layers having the following structure:

$ME—[CC—ME]_{p-1}$ wherein ME is one or more of the electrode material layers, CC is one or more of the porous current collector layers, and $2 \leq p \leq 8$.

7. The rechargeable energy storage device according to claim 1, wherein each of the electrode material layers ME of the negative electrode comprises at least one electrode active material.

8. The rechargeable energy storage device according to claim 1, wherein said negative electrode is a zinc-based negative electrode.

9. The rechargeable energy storage device according to claim 1, further comprising a counter-electrode having an external layer, the first external layer of the negative electrode being configured to face the external layer of the counter-electrode.

10. The rechargeable energy storage device according to claim 2, wherein at least a part or each of the one or more porous current collector layers CC is one of a grid, a perforated sheet, a felt, a meshing, a fabric, and a foam.

11. The rechargeable energy storage device according to claim 2, wherein the porous current collector layers CC, that are identical or different, are conductive material layers.

12. The rechargeable energy storage device according to claim 3, wherein the porous current collector layers CC, that are identical or different, are conductive material layers.

13. The rechargeable energy storage device according to claim 1, wherein each of the electrode material layers ME comprises at least one electrode active material comprising a polymer binder.

14. The rechargeable energy storage device according to claim 1, wherein each of the electrode material layers ME comprises at least one electrode active material comprising an electronic conductivity agent.

15. The rechargeable energy storage device according to claim 1, further comprising at least one positive electrode.

16. The rechargeable energy storage device according to claim 1, wherein said rechargeable energy storage device is chosen among an alkaline accumulator, a lithium-ion battery, a lead battery, a nickel-metal hydride battery, and a supercapacitor.

17. The device according to claim 1, wherein said rechargeable energy storage device is an alkaline accumulator chosen among a zinc/air battery and a zinc/nickel battery.

18. A method for improving an energy density of the rechargeable energy storage device according to claim 1, the method comprising applying the negative electrode to the energy storage device.

19. The method according to claim 18, wherein the negative electrode is in an alkaline accumulator.

* * * * *